United States Patent [19]

Honma et al.

[11] Patent Number: 4,618,040

[45] Date of Patent: Oct. 21, 1986

[54] APPARATUS FOR MAINTAINING VEHICLE BRAKING FORCE

[75] Inventors: Minoru Honma, Atsugi; Toshihiro Hattori, Ayase; Hideo Saito, Hiratsuka; Masaki Ishihara, Fujisawa, all of Japan

[73] Assignee: Isuzu Motors Limited, Tokyo, Japan

[21] Appl. No.: 625,010

[22] Filed: Jun. 27, 1984

[30] Foreign Application Priority Data

Jun. 29, 1983 [JP] Japan ............................. 58-117483
Jun. 30, 1983 [JP] Japan ............................. 58-118459

[51] Int. Cl.$^4$ .......................................... B60K 41/28
[52] U.S. Cl. ............................. 192/0.09; 192/0.094; 192/9
[58] Field of Search ................. 192/0.09, 4 A, 0.092, 192/0.094, 0.073, 0.075, 0.076, 12 D, 9, 3 TR; 303/20

[56] References Cited

U.S. PATENT DOCUMENTS

| | | | |
|---|---|---|---|
| 3,127,966 | 4/1964 | Sheriff et al. | 192/3 TR |
| 3,705,643 | 12/1972 | Iwaoka et al. | 192/4 A X |
| 4,163,586 | 8/1979 | Snyder | 303/20 |
| 4,194,608 | 3/1980 | Usui et al. | 192/0.075 X |
| 4,262,783 | 4/1981 | Scarrott et al. | 192/0.09 |
| 4,273,224 | 6/1981 | Brown et al. | 192/4 A |
| 4,487,303 | 12/1984 | Boueri et al. | 192/0.076 X |

Primary Examiner—George H. Krizmanich
Attorney, Agent, or Firm—Staas & Halsey

[57] ABSTRACT

An apparatus is provided for maintaining a braking force applied to a vehicle including an electromagnetic check valve disposed in a brake actuating fluid circuit, a set of sensors for sensing operating conditions of the vehicle, and an electronic control unit receiving, as inputs thereto, detection signals produced by the set of sensors for collectively controlling the detection signals to control operation of the electromagnetic check valve.

11 Claims, 8 Drawing Figures

Fig. 1
PRIOR ART
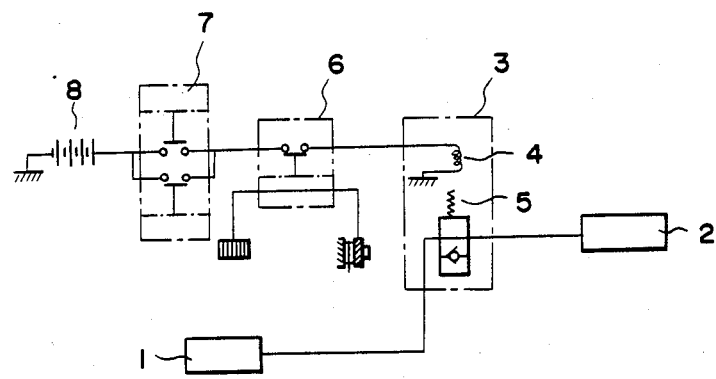
Fig. 2(a)
PRIOR ART
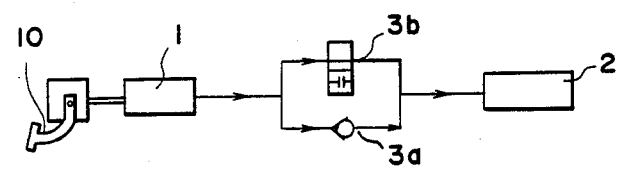
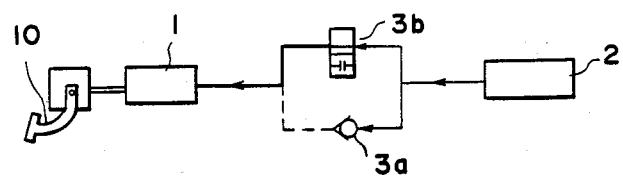
Fig. 2(b)

Fig. 5(a)

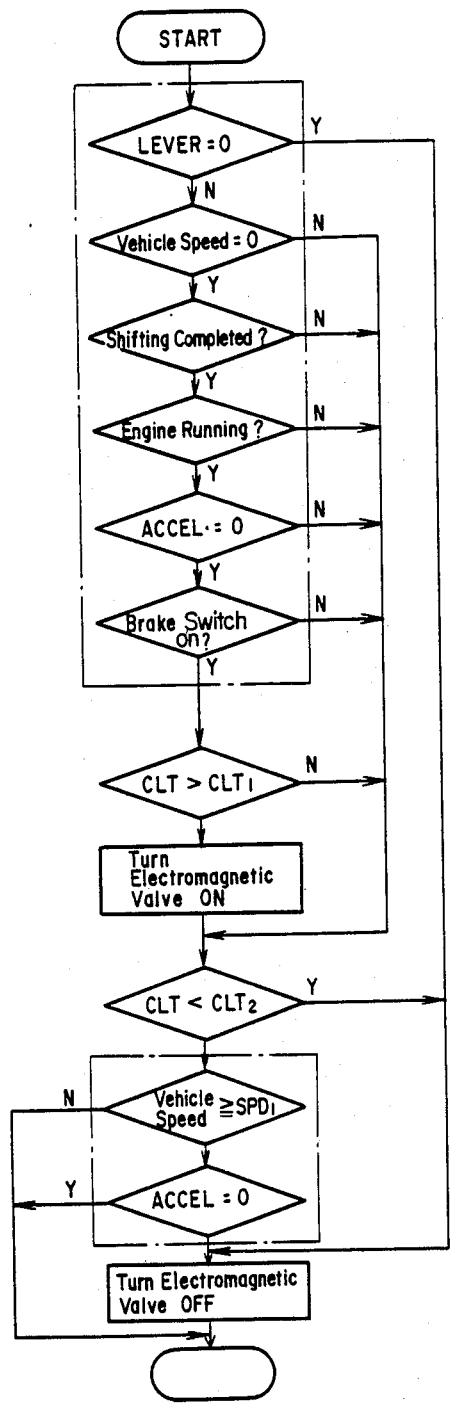

Fig. 5(b)

| SYMBOL | MEANING |
|---|---|
| CLT | AMOUNT OF CLUTCH ENGAGEMENT |
| $CLT_1$ | POSITION AT WHICH DISENGAGEMENT IS COMPLETED |
| $CLT_2$ | POSITION AT WHICH ENGAGEMENT STARTS |
| | THE LARGER CLT, THE LARGER THE AMOUNT OF DISENGAGEMENT |
| | THE SMALLER CLT, THE LARGER THE AMOUNT OF ENGAGEMENT |
| ACCEL | AMOUNT OF ACCELERATOR PEDAL DEPRESSION |
| | ACCEL=0 REPRESENTS IDLING |
| $SPD_1$ | SET VEHICLE SPEED |
| LEVER | SELECT POSITION SIGNAL |
| 0 | NEUTRAL |
| 1 | 1st GEAR RANGE |
| 2 | 2nd GEAR RANGE |
| 3 | 3rd GEAR RANGE |
| 4 | DRIVE GEAR RANGE |
| 6 | REVERSE GEAR RANGE |

APPARATUS FOR MAINTAINING VEHICLE BRAKING FORCE

BACKGROUND OF THE INVENTION

This invention relates to an apparatus for maintaining a braking force applied to a vehicle and, more particularly, to such apparatus which is also capable of starting a vehicle smoothly when the vehicle is at rest on an upgrade.

When a vehicle on an upgrade is to be moved forward, the driver of the conventional vehicle engages the hand brake with one hand to apply a braking force to the vehicle. Then, while engaging the clutch, the driver steps down on the accelerator pedal and slowly releases the hand brake to move the vehicle forward. In a case where the vehicle cannot be stopped on the upgrade effectively because the braking force applied by the hand brake alone is insufficient, the driver steps down on the brake pedal with his right foot to stop the vehicle, steps down on the clutch pedal with his left foot and puts the vehicle in gear. The driver then withdraws his left foot from the clutch pedal and transfers his right foot from the brake pedal to the accelerator pedal to raise the engine rpm. As the engine rpm is being raised, the vehicle is propelled forward when the clutch is engaged in concurrence with removal of the driver's foot from the brake pedal.

The coordinated operation of the hand brake, clutch pedal and accelerator pedal, or the operation of the clutch pedal in coordination with the changeover from the brake pedal to the accelerator pedal must be performed with certain timing or else the engine will stall or the vehicle will move backward. These operations require that the driver have considerable skill. A major accident can occur if the engine should happen to stall when attempting to start the stationary vehicle on an upgrade or at a railrod crossing. Hence there is a need for development of an apparatus for maintaining a braking force applied to a vehicle, which apparatus is also capable of starting a stopped vehicle smoothly on an upgrade or at a railroad crossing.

An apparatus of this type has already been proposed and is shown in FIG. 1. The apparatus has an electromagnetic check valve 3 disposed in a conduit interconnecting a master cylinder 1 and a brake oil cylinder 2 of a hydraulic brake unit. The electromagnetic check valve 3 is adapted for electromagnetic switching and includes a solenoid 4, a return spring 5 and a magnetically attractive core consisting of a magnetic body. The solenoid 4 constitutes part of an electrical circuit in which there are serially connected a switch 6 for sensing engagement of a clutch, and a switch 7 actuated in association with a device for sensing selection of a specific gear position, with relation to part of a gear position selection mechanism in a transmission. The switch 7 is connected to a storage battery 8.

Reference will now be had to FIGS. 2(a) and (b) to describe in detail the operatin of the braking force maintaining apparatus having the construction shown in FIG. 1.

FIGS. 2(a) and (b) illustrate an ordinary braking operation, namely a state in which the solenoid 4 of the electromagnetic valve 3 shown in FIG. 1 is deenergized. With the solenoid 4 deenergized, operating the master cylinder 1 by pressing down on the brake pedal 10 supplies hydraulic pressure to the brake oil cylinder 2 through hydraulic pressure routes 3a, 3b to apply the brake, as shown in FIG. 2(a). When the driver removes his foot from the brake pedal 10 with the solenoid 4 in the deenergized state, the hydraulic pressure is returned to the master cylinder 1 solely through the hydraulic route 3b, thereby releasing the brake, as shown in FIG. 2(b).

Next, with the solenoid 4 of the electromagnetic valve 3 in the energized state, the brake oil from the master cylinder 1, which is coupled to the brake pedal 10, flows into the brake oil cylinder 2 through the other oil route 3a to supply the brake oil cylinder 2 with hydraulic pressure and, hence, engage the brake. Under these conditions, the hydraulic routes 3a and 3b are both closed in the direction leading from the brake oil cylinder 2 to the master cylinder 1 to prevent backward flow of the brake oil from the brake oil cylinder 2. In other words, the braking pressure is maintained so that the brake will be held in the engaged state even when the brake pedal 10 is released. When the solenoid 4 is deenergized, however, the electromagnetic valve 3 opens the route 3b, whereby the brake brake oil maintained in the oil cylinder 2 is returned to the master cylinder 1 to disengage the brake.

Since this prior-art apparatus for maintaining braking force controls the electromagnetic check valve 3 by simple electrical circuitry which includes the switch 6 for sensing clutch engagement and the switch 7 for sensing the specific gear position of the transmission, it is difficult to control the electromagnetic check valve at the same time it is desired to move the vehicle to move from rest. As a result, smooth control of the braking force when starting the vehicle from rest cannot be achieved. For this reason, the prior-art apparatus described above has not yet been put into practical use.

SUMMARY OF THE INVENTION

An object of the present invention is to provide an apparatus for maintaining a braking force applied to a vehicle, whereby a braking force which remains applied to a vehicle when the vehicle can be at rest is removed synchronously with the operation of moving the vehicle from rest to prevent the vehicle from moving backward at such time.

Another object of the present invention is to provide an apparatus for maintaining a braking force applied to a vehicle, whereby a braking force can be maintained and removed in a rapid and accurate manner dependent upon the operating conditions of the vehicle.

Still another object of the present invention is to provide an apparatus for maintaining a braking force applied to a vehicle, which apparatus is suitable for vehicles equipped with a friction clutch.

A further object of the present invention is to provide an apparatus for maintaining a braking force applied to a vehicle, which apparatus is suitable for vehicles equipped with an automatic transmission.

According to the present invention, the foregoing objects are attained by providing an apparatus for maintaining a braking force applied to a vehicle having an electromagnetic check valve disposed in a brake actuating fluid circuit. The apparatus is provided with sensing means for sensing the operating conditions of the vehicle, and an electronic control unit receiving, as inputs thereto, detection signals produced by the sensing means for collectively controlling the detection signals to control operation of the electromagnetic check valve.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

FIG. 1 is a schematic view illustrating an apparatus for maintaining a braking force applied to a vehicle in accordance with the prior art;

FIGS. 2(a) and (b) are schematic views illustrating the operation of an electromagnetic check valve used in the prior art apparatus of FIG. 1;

FIG. 2(b) is a schematic view illustrating the operation of an electromagnetic check valve used in the prior art apparatus of FIG. 1;

FIG. 5(a) is a schematic view illustrating control conditions of the apparatus according to the present invention;

FIG. 5(b) is a schematic view illustrating control conditions of the apparatus according to the present invention.

DETAILED DESCRIPTION OF THE PREFERRED EMBODIMENTS

Figure 3:
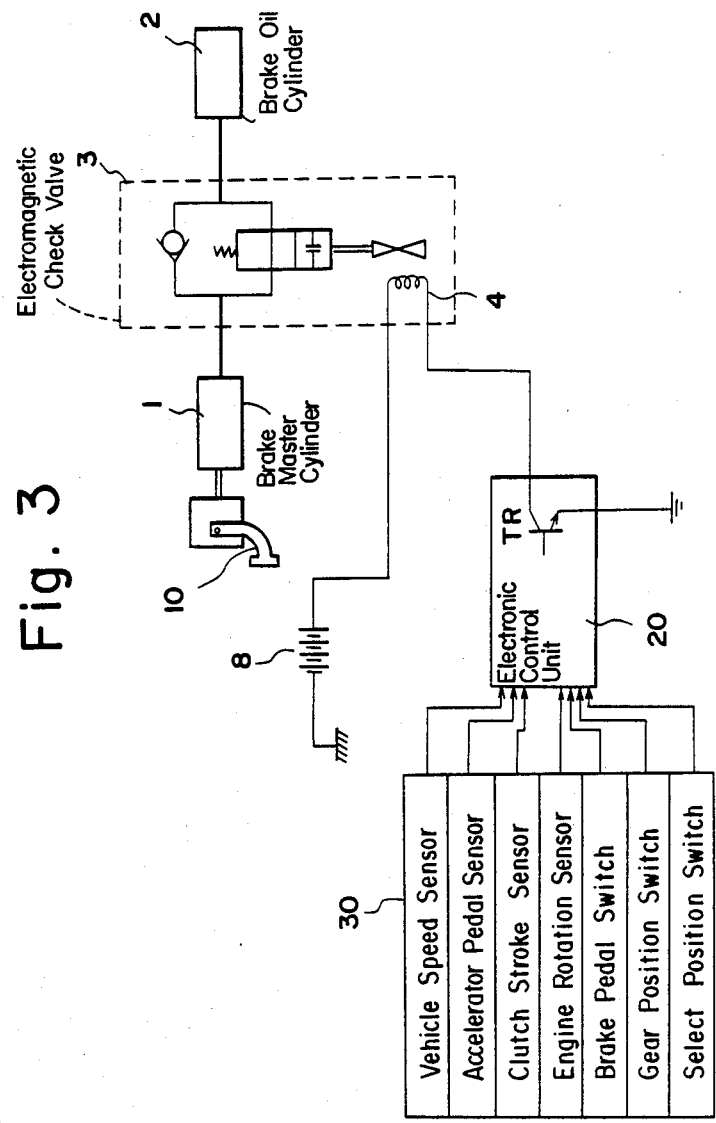
FIG. 3 is a schematic view illustrating the construction of an apparatus for maintaining a braking force applied to a vehicle according to an embodiment of the present invention.

With reference to FIG. 3, a brake master cylinder 1 is actuated by a brake pedal 10. Numeral 2 denotes a brake oil cylinder, and numeral 3 designates an electromagnetic check valve disposed in a conduit interconnecting the brake oil cylinder 2 and the master cylinder 1. The arrangement thus far is similar to that of the above-described conventional apparatus and functions in a similar manner. The solenoid 4 is connected at one end to the storage battery 8.

An electronic control unit 20 having a transistor TR controls the electromagnetic check valve 3 in accordance with output signals obtained from sensing means 30 for sensing the operating conditions of the vehicle. The sensing means 30 includes a vehicle speed sensor for sensing the travelling speed of the vehicle, an accelerator pedal sensor for sensing the amount by which an accelerator pedal is depressed, a clutch stroke sensor for sensing the amount of engagement of a clutch, an engine rotation sensor for sensing engine rpm, a brake pedal switch for sensing whether or not the brake pedal is actuated, a gear position switch for sensing the gear position of the transmission, and a select position switch for sensing the operating position of a select lever.

When certain operating conditions, described below, are satisfied, the electronic control unit 20, on the basis of the various output signals produced by the sensing means 30, actuates the solenoid 4 of the electromagnetic check valve 3 by a drive signal developed at the base of the transistor TR to close the electromagnetic check valve 3 and to open the electromagnetic check valve 3 under predetermined conditions, thereby maintaining and removing the braking force depending upon the operating conditions of the vehicle.

Figure 4:
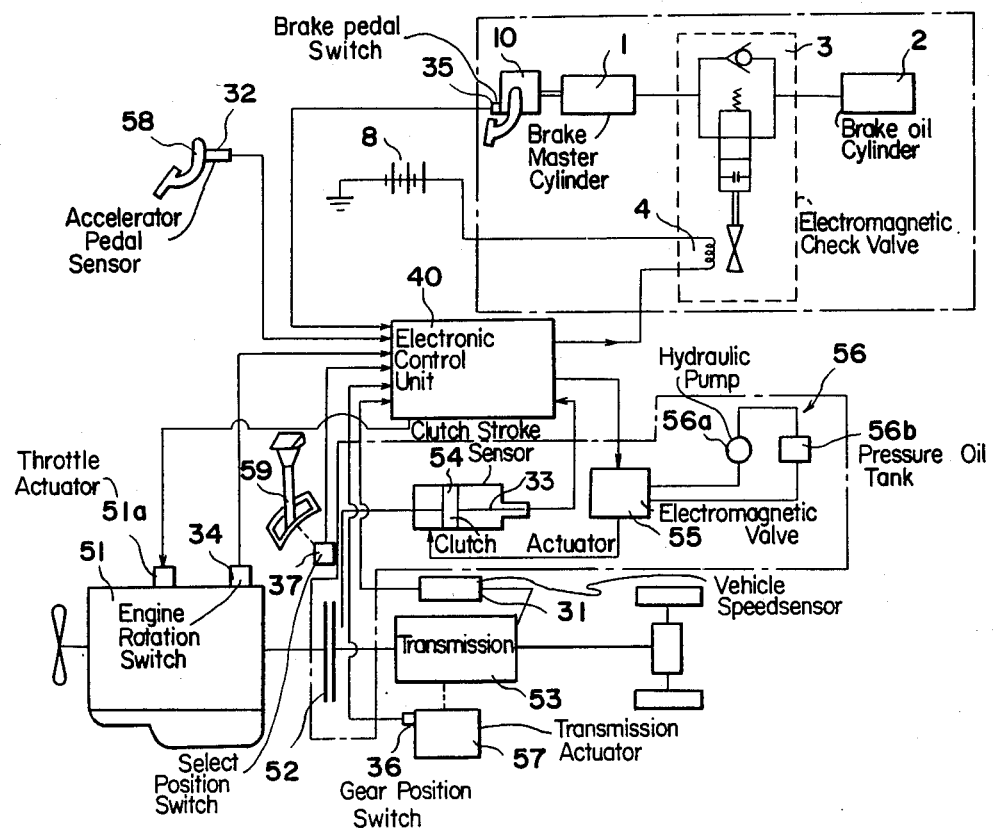
FIG. 4 is a schematic view illustrating the construction of an apparatus for maintaining a braking force applied to a vehicle according to another embodiment of the present invention.
Figure 6:
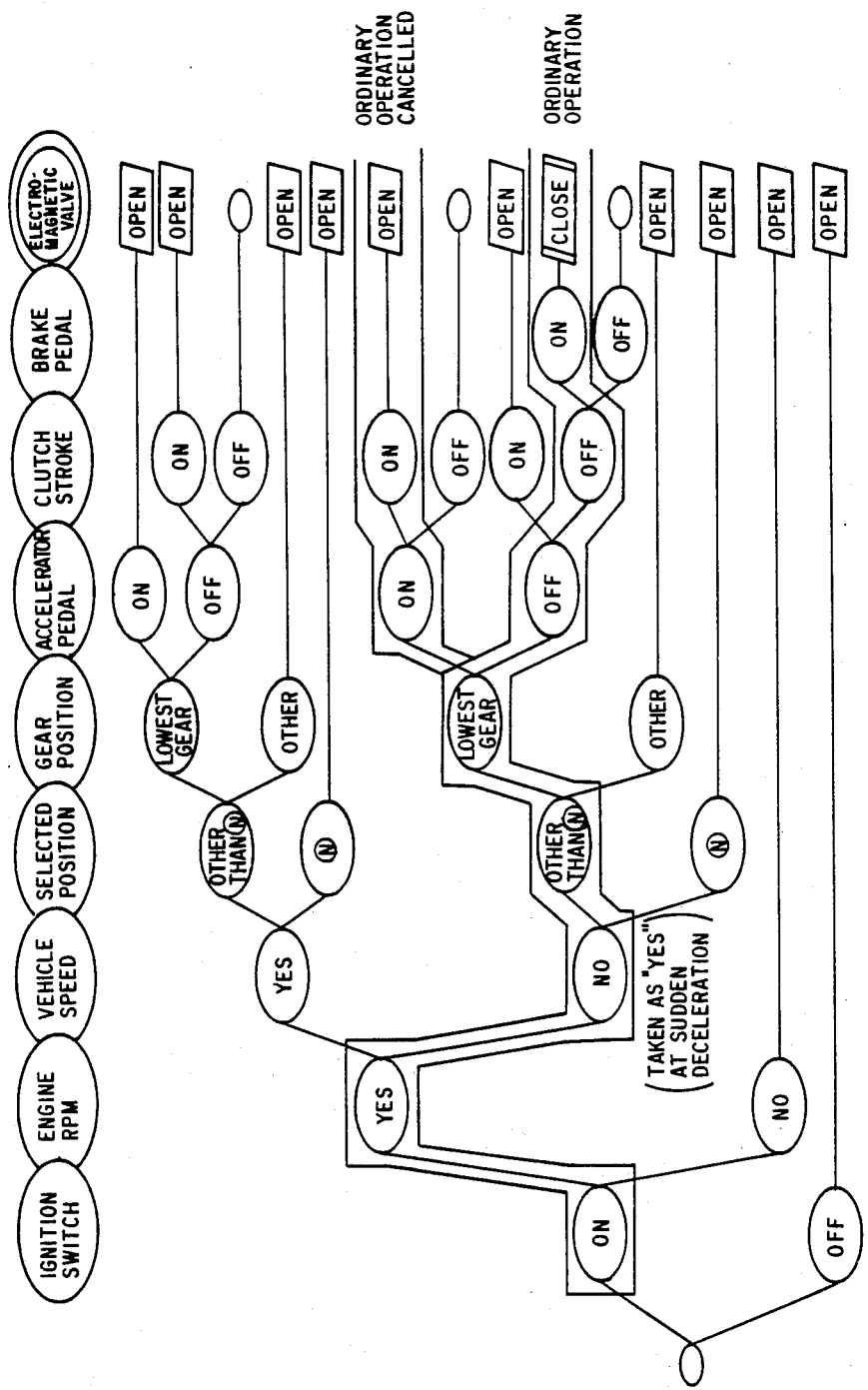
FIG. 6 is a schematic vie illustrating control conditions of the apparatus according to the present invention.

FIG. 4 is a view showing the apparatus of the present invention applied to a vehicle having an automatic transmission. Portions similar to those shown in FIG. 3 are designated by like reference characters. The brake master cylinder 1 is actuated by the brake pedal 10. The electromagnetic check valve 3, having the solenoid 4 connected to the storage battery 8, is disposed in a conduit interconnecting the brake oil cylinder 2 and the master cylinder 1. Numeral 40 denotes an electronic control unit constituted by a microcomputer for controlling the electromagnetic check valve 3.

Numeral 51 denotes an engine having a throttle valve or a throttle actuator 51a for actuating a fuel injection pump (not shown). A clutch 52 composed of a well-known dry-type, single-disk, friction clutch is for transmitting the motive force of the engine 51 to, or for disconnecting the motive force from, a parallel shaft, gear-type transmission 53. Numeral 54 denotes a clutch actuator for controlling the amount of engagement of the clutch 52 and having a hydraulic chamber which communicates via an electromagnetic valve 55 with a hydraulic mechanism 56 including a hydraulic pump 56a and a pressure oil tank 56b. A transmission actuator 57 controls the shifting of gears within the transmission 53 and is connected to the hydraulic mechanism 56 to be hydraulically controlled thereby.

Sensors include a vehicle speed sensor 31 disposed opposite the output shaft of the transmission 53; an accelerator pedal sensor 32 for sensing the amount of depression of an accelertor pedal 58; a clutch stroke sensor 33 mounted on the clutch actuator 54 for sensing the amount of engagement of the clutch 52; an engine rotation sensor 34 disposed opposite the flywheel (not shown) of the engine 51 for sensing the engine rpm; a brake pedal switch 35 mounted on the brake pedal 10 for sensing whether or not the brake pedal is operated; a gear position switch 36 mounted on the transmission actuator 57 for sensing the gear position of the transmission 53; and a select position switch 37 for sensing a position selected by a select lever 59. Output signals from these sensors are applied to the electronic control unit 40, on the basis of which the electronic control unit 40 actuates the electromagnetic check valve 3 to maintain or release braking force.

An automatic shifting operation performed by the arrangement of FIG. 4 takes place in the following manner. On the basis of a signal indicative of an amount of accelerator pedal depression received from the accelerator pedal sensor 32, as well as a signal indicative of vehicle speed received from the vehicle speed sensor 31, the electronic control unit 40 derives an optimum gear position and produces an output signal indicative thereof. The electromagnetic valve 3 is actuated in response to this signal and causes the clutch actuator 54 to disengage the clutch 52. At the same time, the throttle actuator 51a is controlled to decrease the amount of fuel supplied. Next, the electronic control unit 40 controls the transmission actuator 57, which responds by effecting a changeover from the present gear position to the optimum gear position derived in the manner described above. The electronic control unit 40 then controls the electromagnetic valve 55 to actuate the clutch actuator 54, thereby engaging the clutch 52 to complete the shifting operation. The electronic control unit 40 simultaneously operates the throttle actuator 51a by an amount corresponding to the amount of accelerator pedal depression.

The operation of the braking apparatus of the construction shown in FIGS. 3 and 4 will now be described with reference to FIGS. 5(a) and (b) and 6.

The electronic control unit 40 (20) turns on the electromagnetic check valve 3 to maintain the braking state only when the following conditions are in effect: (1) the position selected by the select lever 59 is other than neutral; (2) the vehicle speed is zero, i.e., the vehicle is at rest; (3) the transmission 53 is in low gear (ordinarily first gear); (4) the engine 51 is rotating; (5) the accelerator pedal 58 is not depressed, i.e., the amount of accelerator pedal 58 depression is zero; (6) the brake pedal switch is in the on position and (7) the clutch stroke sensor 33 is in the off position, i.e., the clutch 52 is disengaged. More specifically, when the foregoing conditions are in effect, the electromagnetic check valve 3 cuts off the passage introducing hydraulic pressure from the brake oil cylinder 2 to the master cylinder 1, so that the brake oil supplied to the brake oil cylinder 2 is kept within the brake oil cylinder 2. The braking state is thus maintained even when the driver removes his foot from the brake pedal 10.

The electromagnetic valve 3 must be turned off to cancel the foregoing state, namely the state in which the braking force is maintained. The electronic control unit 40 (20) will accomplish this when the following conditions are in effect: (1) the select lever 59 is in a position other than neutral; (2) the vehicle speed is equal to or greater than a set vehicle speed SPD1, for example, 4 Km/H; (3) the transmission 53 is in a low gear (ordinarily first gear) at which the vehicle is capable of being started, (4) the engine 51 is rotating; (5) the accelerator pedal 58 is depressed to turn on the accelerator pedal sensor 32, and the clutch actuator 54 is operated by depression of the accelerator pedal 58; and (6) the clutch stroke sensor 33 is in the ON position. Thus, when the vehicle is started from rest, the electronic control unit 40 engages the clutch actuator 54 in accordance with the amount of accelerator pedal depression. When the conditions for starting the vehicle are satisfied, therefore, the electromagnetic check valve 3 is turned off.

It will be apparent from the flowchart of FIG. 5(a) that the electromagnetic valve 3 is turned off when it is sensed that the engine 51 has stopped rotating or that the vehicle is travelling.

Thus, according to the inventive apparatus for maintaining vehicle braking force, an electronic control unit controls an electromagnetic check valve, which is disposed in the fluid pressure circuit of a brake, on the basis of output signals from sensing means for sensing the operating conditions of the vehicle. A braking force applied to the vehicle is maintained or removed by the operation of the electromagnetic valve. Braking force at the time that the vehicle is started from rest can therefore be maintained in a precise manner to assure a smooth start, without backward movement of the vehicle, even when the vehicle is started on an upgrade.

In the illustrated embodiment, the present invention is applied to a hydraulic brake system. However, the invention is not limited to such application but can also be used in a vehicle having a pneumatic brake system.

In such case the electromagnetic check valve would be installed in a fluid pressure circuit leading from a brake valve, which is operated by the brake pedal, to an air chamber-type actuator for operating a brake mechanism.

As many apparently widely different embodiments of the present invention can be made without departing from the spirit and scope thereof, it is to be understood that the invention is not limited to the specific embodiments thereof except as defined in the appended claims.

What we claim is:

1. An apparatus controlled by fluid pressure for maintaining a brake force applied to a vehicle, comprising:
   valve means interposed between a master cylinder and a brake wheel cylinder, said valve means being capable of automatically supplying fluid from the master cylinder to the brake wheel cylinder and automatically stopping the supply of fluid from the brake wheel cylinder;
   first sensing means for sensing when the vehicle has stopped based on the conditions that the vehicle speed is zero, an engine rpm is not zero, an amount of depression of an accelerator pedal is zero, and a brake pedal is actuated;
   second sensing means for sensing when the vehicle begins travelling based on the conditions that a gear transmitting operation is completed, the engine rpm is not zero, the amount of depression of the accelerator pedal is not zero, and the clutch is half engaged; and
   an electronic control means for closing said valve means to maintain the brake force applied to the vehicle when the vehicle has stopped, and for opening said valve means to release the brake force applied to the vehicle when the vehicle begins travelling.

2. The apparatus according to claim 1, wherein said first and second sensing means comprise a vehicle speed sensor, an accelerator pedal sensor, a clutch stroke sensor, an engine rotation sensor, a brake pedal switch, and a gear position switch.

3. The apparatus according to claim 1, wherein said electronic control means comprises a microcomputer.

4. The apparatus according to claim 1, wherein said electronic control means comprises a transistor serving as an output switch to the valve means.

5. The apparatus according to claim 1, wherein the vehicle has a friction clutch.

6. The apparatus according to claim 5, wherein operation of said friction clutch is controlled by said electronic control means.

7. The apparatus according to claim 1, wherein the vehicle has a parallel shaft, gear-type, transmission.

8. The apparatus according to claim 1, wherein the vehicle has an automatic transmission.

9. The apparatus according to claim 1, wherein the vehicle has a hydraulically actuated braking force.

10. The appratus according to claim 1, wherein the vehicle has a pneumatically actuated braking force.

11. The apparatus according to claim 1, wherein said valve means comprises a check valve and an electromagnetic valve.

* * * * *